US010612587B1

United States Patent
Duff et al.

(10) Patent No.: US 10,612,587 B1
(45) Date of Patent: Apr. 7, 2020

(54) PRELOAD MECHANISM FOR ROTATING MIRROR BEARING

(71) Applicant: Waymo LLC, Mountain View, CA (US)

(72) Inventors: David Duff, Mountain View, CA (US); Michael Brickner, Mountain View, CA (US); Paul Karplus, Redwood City, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 16/226,179

(22) Filed: Dec. 19, 2018

Related U.S. Application Data

(60) Provisional application No. 62/753,974, filed on Nov. 1, 2018.

(51) Int. Cl.
| | | |
|---|---|---|
| F16C 25/06 | (2006.01) | |
| F16C 25/08 | (2006.01) | |
| F16C 19/30 | (2006.01) | |
| G01S 7/481 | (2006.01) | |
| G02B 26/12 | (2006.01) | |

(52) U.S. Cl.
CPC ............ *F16C 25/083* (2013.01); *F16C 19/30* (2013.01); *G01S 7/4813* (2013.01); *G02B 26/121* (2013.01)

(58) Field of Classification Search
CPC ........ F16C 19/06; F16C 25/083; F16C 27/04; F16C 2229/00; F16C 2370/00; G01S 7/4813; G02B 26/121
USPC ........................................................ 384/517
See application file for complete search history.

(56) References Cited

U.S. PATENT DOCUMENTS

| | | | | |
|---|---|---|---|---|
| 1,705,281 A | * | 3/1929 | Bott | .................. F16C 27/04 384/518 |
| 3,435,930 A | * | 4/1969 | Scheuerer | ............... F16C 19/55 192/18 R |
| 4,455,758 A | | 6/1984 | Iwafune et al. | |
| 4,667,081 A | | 5/1987 | Turin et al. | |
| 4,866,324 A | * | 9/1989 | Yuzawa | ............... G02B 26/121 310/268 |
| 6,446,339 B2 | | 9/2002 | Takamizawa et al. | |
| 9,726,882 B2 | | 8/2017 | Jones | |
| 2004/0231445 A1 | | 11/2004 | Marcus | |

FOREIGN PATENT DOCUMENTS

JP        H02223361        9/1990

\* cited by examiner

*Primary Examiner* — Phillip A Johnson
(74) *Attorney, Agent, or Firm* — McDonnell Boehnen Hulbert & Berghoff LLP

(57) ABSTRACT

The present disclosure relates to optical systems and related devices, specifically those related to light detection and ranging (LIDAR) systems. An example optical system includes a housing, a shaft defining a rotational axis, and a rotatable optical component coupled to the shaft. The optical system also includes a first rotary bearing having an inner race, an outer race, and a plurality of rolling elements configured to roll between the inner race and the outer race. The inner race is coupled to the shaft and the outer race is coupled to the housing. The optical system also includes a preload mechanism having a spring coupled to the housing and a preload distributor coupled to the spring and the outer race. The spring is configured to apply an axial preload force to the outer race through the preload distributor.

20 Claims, 5 Drawing Sheets

Cross-Sectional View
Along Y-Axis

PRELOAD MECHANISM FOR ROTATING MIRROR BEARING

CROSS-REFERENCE TO RELATED APPLICATION

The present application claims the benefit of U.S. Patent Application No. 62/753,974, filed Nov. 1, 2018, the content of which is herewith incorporated by reference.

BACKGROUND

Mechanical bearings can reduce friction between surfaces of parts that move relative to one another. A rotary bearing (e.g., rolling element bearing) is a bearing that carries a load using rolling elements such as cylinders and/or spheres that roll between an inner ring and an outer ring, also called inner and outer races. The load is continuously redistributed among the rolling elements in a rotary bearing, which reduces friction, wearing, and binding.

A bearing preload is an axial load that can be applied to rolling element bearings to reduce excess motion or play between the rolling elements and the surfaces of the inner and outer races. By properly preloading a rotary bearing, the rolling elements will roll rather than slide, preventing race misalignment and premature bearing wear.

SUMMARY

The present disclosure generally relates to an optical system with a rotatable optical component. The optical system includes a preload mechanism configured to apply an axial preload to at least one rotary bearing so as to improve its performance.

In a first aspect, an optical system is provided. The optical system includes a housing, a shaft defining a rotational axis, and a rotatable optical component coupled to the shaft. The optical system also includes a first rotary bearing having an inner race, an outer race, and a plurality of rolling elements configured to roll between the inner race and the outer race. The inner race is coupled to the shaft and the outer race is coupled to the housing. The optical system also includes a preload mechanism, which includes a spring coupled to the housing and a preload distributor coupled to the spring and the outer race. The spring is configured to apply an axial preload force to the outer race through the preload distributor.

In a second aspect, a method is provided. The method includes applying, with a preload mechanism, an axial preload force to an outer race of a rotary bearing. An inner race of the rotary bearing is coupled to a shaft, which defines a rotational axis. A plurality of rolling elements is configured to roll between the inner race and the outer race. The preload mechanism includes a spring coupled to a housing and a preload distributor coupled to the spring and the outer race. The method further includes rotating a rotatable optical component coupled to the shaft while the preload mechanism is applying the axial preload force.

In a third aspect, a light detection and ranging (LIDAR) system is provided. The LIDAR system includes at least one rotary bearing and a spring coupled to the at least one rotary bearing. The spring is formed from sheet-type material. The spring includes a serpentine shape.

Other aspects, embodiments, and implementations will become apparent to those of ordinary skill in the art by reading the following detailed description, with reference where appropriate to the accompanying drawings.

DETAILED DESCRIPTION

Figure 1:
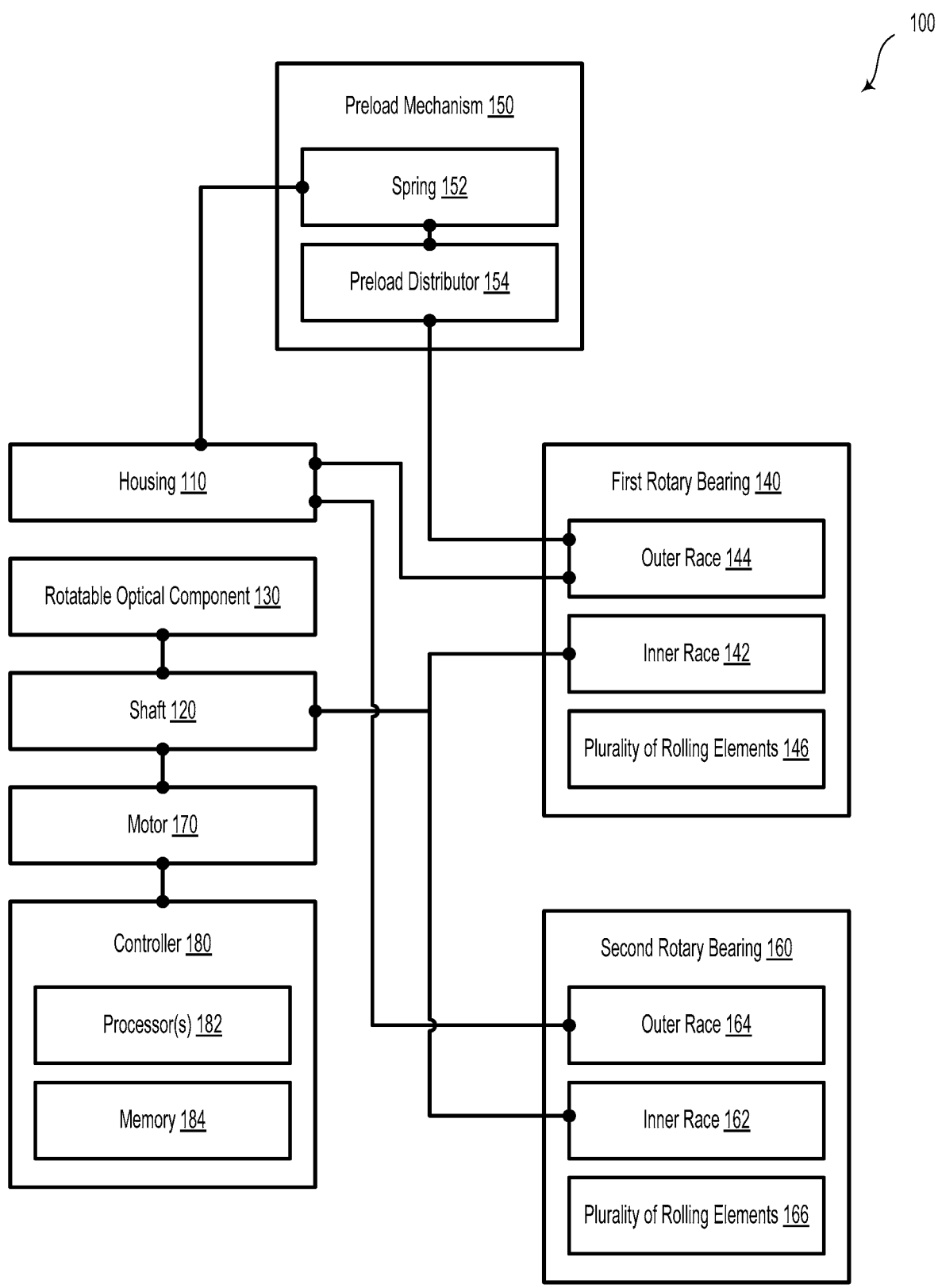
FIG. 1 illustrates an optical system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

In an example embodiment, an optical system could include a rotatable component, such as a mirror. In some examples, the optical system could be a LIDAR and the mirror could redirect light pulses toward an external environment.

In some embodiments, the rotatable component (e.g., the mirror) is coupled to a shaft. In such scenarios, the shaft could be coupled (e.g., glued or otherwise fastened) to an inner race of a first bearing, and the outer race of the first bearing could be coupled (e.g., press-fit) to a housing. Rolling elements, such as balls, could be disposed between the inner and outer races. Accordingly, the inner and outer races of the first bearing could rotate with respect to one another with little friction.

Additionally, the shaft could be coupled to a second bearing. The outer race of the second bearing could be abutted to the housing and a stop along the shaft could be abutted to the inner race of the second bearing.

In an example embodiment, to improve the performance of the first and second bearings, a bearing preload could be applied using a preload mechanism. In some embodiments, the preload mechanism could be configured to apply a preload force along the axial direction between the inner race and the outer race, reducing play between the rolling elements and the races. The preload mechanism could include a preload distributor and a spring. The preload distributor could be configured to evenly distribute the preload force along the outer race and thereby reduce play in substantially equal amounts around the inner and outer races.

In example embodiments, the spring could be formed from sheet-type material and could include a flat serpentine shape. The spring could be formed from steel, although other elastically deformable materials are contemplated within the context of this disclosure. The spring could be coupled to the housing at two end locations.

In some embodiments, the spring constant of the spring may be proportional to the cross-sectional shape of the spring. The spring thickness could have a tolerance of about 0.005 mm or less. The width of the spring could be controlled to around 0.3 mm or less.

In some scenarios, the preload distributor could be disk-shaped and could include a protrusion on a first side of the preload distributor and a rim portion on a second side. The preload distributor could be physically coupled to the spring (e.g., at or near the protrusion, which could be at a region of the spring that is coaxial with the shaft and bearings). Furthermore, the rim portion of the preload distributor could be in contact with the outer race of the first bearing while deforming the clamped spring. That is, a middle portion of the spring could be deformed or deflected in an out-of-plane direction.

In such examples, the restorative spring force may be translated through the protrusion and the rim of the preload mechanism. In such a manner, a restorative spring force could be transferred from the spring to the preload distributor so as to apply an axial force to the outer race of the first bearing. In so doing, the outer races of both the first and second bearing could be displaced slightly along the axial direction with respect to their respective inner races. The preload distributor could be formed from brass, but other materials are possible.

II. Example Optical Systems

FIG. 1 illustrates an optical system 100, according to an example embodiment. The optical system 100 includes a housing 110. The optical system 100 also includes a shaft 120 defining a rotational axis.

In some embodiments, the shaft 120 could include a straight shaft section with a diameter of about 2 millimeters. However, other shaft diameters (e.g., 1-5 millimeters, or greater) are possible and contemplated. The shaft 120 could be formed from steel. However, other materials, such as aluminum, brass, copper, ceramic, composite materials, and/or other rigid materials are possible and contemplated.

In some embodiments, the shaft 120 could be operable to be rotated by way of a motor 170. The motor 170 could include, for example, a rotary direct current (DC) motor or a rotary alternating current (AC) motor. Motor 170 could be a stepper motor, a brushed or brushless DC motor, or another type of rotational actuator. Other types of rotational actuators configured to convert electrical energy to an application of rotational mechanical energy to the shaft 120 are contemplated and possible.

Motor 170 could be controlled by a controller 180, which could include at least one of a field-programmable gate array (FPGA) or an application-specific integrated circuit (ASIC). Additionally or alternatively, the controller 180 may include one or more processors 182 and a memory 184. The one or more processors 182 may be a general-purpose processor or a special-purpose processor (e.g., digital signal processors, etc.). The one or more processors 182 may be configured to execute computer-readable program instructions that are stored in the memory 184. As such, the one or more processors 182 may execute the program instructions to provide at least some of the functionality and operations described herein.

The memory 184 may include or take the form of one or more computer-readable storage media that may be read or accessed by the one or more processors 182. The one or more computer-readable storage media can include volatile and/or non-volatile storage components, such as optical, magnetic, organic or other memory or disc storage, which may be integrated in whole or in part with at least one of the one or more processors 182. In some embodiments, the memory 184 may be implemented using a single physical device (e.g., one optical, magnetic, organic or other memory or disc storage unit), while in other embodiments, the memory 184 can be implemented using two or more physical devices.

The optical system 100 additionally includes a rotatable optical component 130 coupled to the shaft 120. In such scenarios, the rotatable optical component 130 could include a multi-sided mirror, such as a three-sided prism mirror. The multi-sided mirror could include 2 sides or, alternatively, 4 or more sides. In some embodiments, the rotatable optical component 130 could be formed from polycarbonate. However, other solid materials are possible and contemplated. For example, the rotatable optical component 130 could include plastic, ceramic, composite materials, or another type of material.

In some embodiments, at least a portion of the rotatable optical component 130 is hollow. For example, the rotatable optical component 130 could include a hollow portion (e.g., a cavity, void, hole, or another type of opening) so as to reduce mass and/or to avoid potential issues with expansion/contraction due to a mismatch of the coefficient of thermal expansion between the shaft 120 and the rotatable optical component 130, which could be formed from polycarbonate or another type of material having a solid structure.

In example embodiments, the rotatable optical component 130 could include a plurality of reflective surface. For example, the plurality of reflective surfaces may include three reflective surfaces arranged symmetrically about the rotational axis such that the rotatable optical component 130 has a triangular prism shape. The plurality of reflective surfaces could include a reflective material, such as titanium, platinum, or aluminum. Other types of reflective materials are possible. In some example embodiments, the reflective surfaces could be coated with a dielectric coating (e.g., a high-reflectivity coating or an anti-reflective coating), such as a Bragg stack or a wavelength selective coating. Other types of coatings are possible.

In some embodiments, the rotatable optical component 130 may be configured to rotate about its rotational axis at a rotational frequency of about 30,000 revolutions per minute (RPM). Other rotational frequencies of the rotatable optical component 130 are possible. For example, the rotatable optical component 130 may rotate about its rotational axis within a rotational frequency range between 100 RPM and 100,000 RPM.

The optical system 100 yet further includes a first rotary bearing 140. The first rotary bearing 140 includes an inner race 142 and an outer race 144. The first rotary bearing 140 also includes a plurality of rolling elements 146. The plurality of rolling elements is configured to roll and/or slide between the inner race 142 and the outer race 144. In such scenarios, the inner race 142 is coupled to the shaft 120. For example, the inner race 142 could be coupled to the shaft 120 by way of an adhesive material, such as epoxy. Additionally or alternatively, the inner race 142 could be retained to the shaft 120 by way of one or more stops.

In some embodiments, the outer race 144 is loosely coupled to the housing 110. For example, the outer race 144 could be press fit into the housing 110. The loose fit of the outer race 144 can provide some play along the axial direction. In the present disclosure applying an axial force to the outer race 144 can improve the operating characteristics of the first rotary bearing 140 and/or other elements within the optical system 100.

The optical system 100 additionally includes a preload mechanism 150. The preload mechanism 150 includes a spring 152 coupled to the housing 110. The preload mechanism 150 also includes a preload distributor 154. The preload distributor 154 is coupled to the spring 152 and the outer race 144. The spring 152 is configured to apply an axial preload force 159 to the outer race 144 through the preload distributor 154.

In various embodiments, the spring 152 could include brass. Alternatively, the spring 152 could be formed from aluminum, copper, steel (e.g., spring steel), or another solid material. Furthermore, the preload distributor 154 could include brass, aluminum, copper, steel, or another solid material. To avoid material expansion/contraction issues having to do with coefficient of thermal expansion (CTE) mismatch, the spring 152 and the preload distributor 154 could be formed from a similar or identical material.

The spring 152 is configured to provide a spring force in response to bending. The preload distributor 154 is configured to transfer the spring force to the outer race 144 as an axial preload force. The axial preload force is proportional to at least one of a cross-sectional shape or a length of the spring 152. Put another way, a middle portion of the spring 152 could be deformed (e.g., deflected) in an out-of-plane direction. The axial preload force is proportional to an out-of-plane deflection of the spring as illustrated and described elsewhere herein.

In some embodiments, the spring 152 could have a thickness within a range of 50 microns to 150 microns, although other thicknesses are possible. In some embodiments, the thickness of the spring can be controlled within 5 microns or less. Accordingly, a spring force could be well-controlled given a Furthermore, while spring 152 could include a material formed in a sheet shape, it will be understood that the spring 152 could take a different shape (e.g., coil or helical spring, a cantilever spring, etc.). Furthermore, the spring 152 could take another shape, such as a Belleville washer, a wave spring washer, or a curved spring washer.

In some embodiments, the optical system 100 can include a second rotary bearing 160. In such scenarios, the second rotary bearing 160 could include an outer race 164, an inner race 162, and a plurality of rolling elements 166 that are configured to roll between the races. In some embodiments, the outer race 164 of the second rotary bearing 160 could be abutted to the housing 110. The inner race 162 of the second rotary bearing 160 could be abutted to a stop along the shaft 120.

Figure 2A:
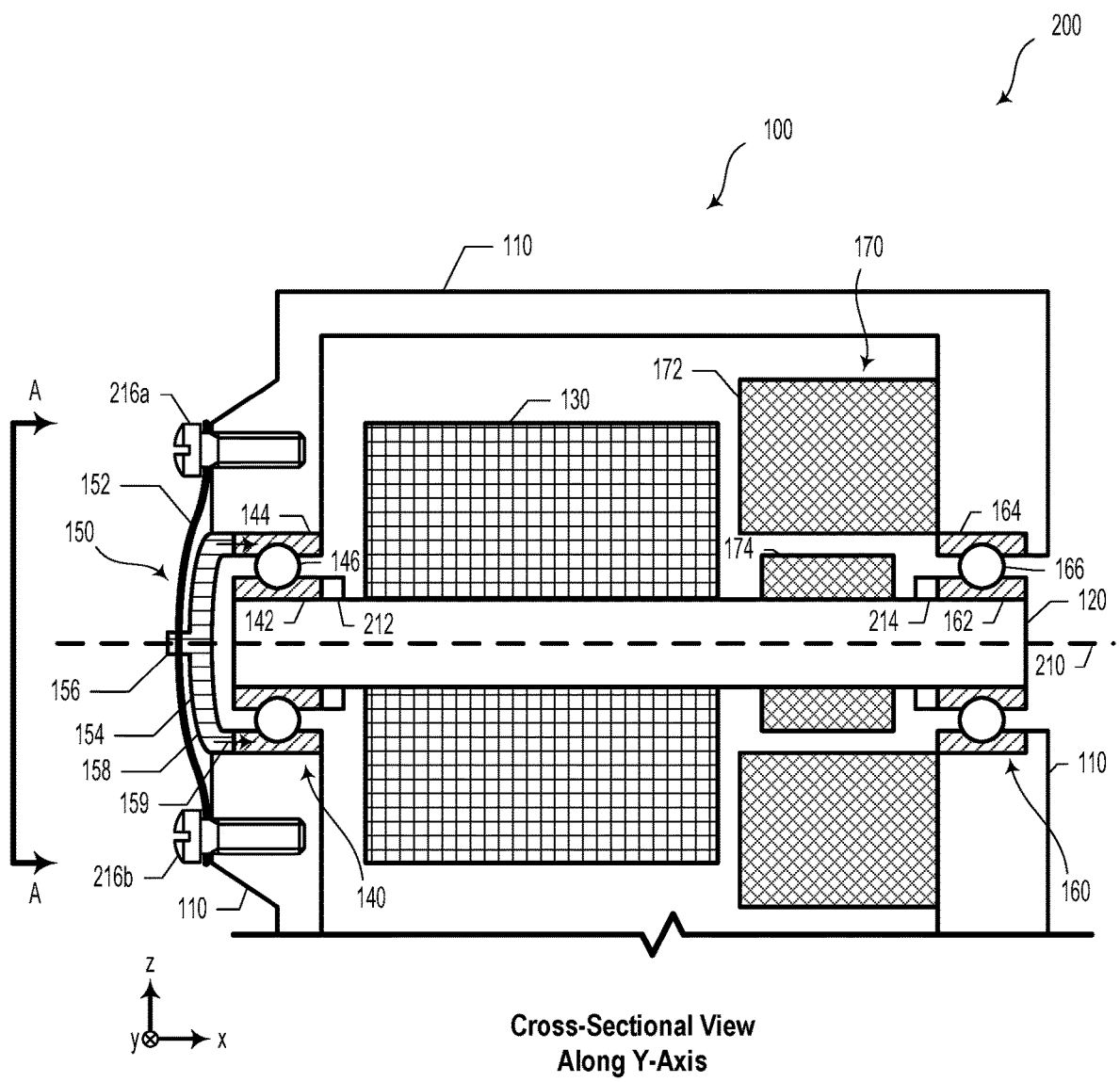
FIG. 2A is a cross-sectional view of an optical system, according to an example embodiment.

FIG. 2A illustrates a cross-sectional view of an optical system 200, according to an example embodiment. The optical system 200 is illustrated with a view along the y-axis according to the coordinate system defined in FIG. 2A. The optical system 200 could be similar or identical to optical system 100, as illustrated and described in reference to FIG. 1. For example, similar to optical system 100, optical system 200 includes a housing 110, a shaft 120, and a first rotary bearing 140. The shaft 120 is configured to rotate about rotational axis 210. Furthermore, the optical system 200 includes a rotatable optical component 130 that is coupled to the shaft 120.

Optical system 100 and/or optical system 200 could form at least a portion of a LIDAR system for an autonomous vehicle, such as a self-driving car or an autonomous aerial vehicle.

The optical system 200 includes a preload mechanism 150. The preload mechanism 150 includes a spring 152 and a preload distributor 154. In some embodiments, the spring 152 could be coupled to the preload distributor 154 by way of a protrusion 156, which could be located at a middle portion of the preload distributor 154. The spring 152 could be coupled to the housing 110 by way of screws 216a and 216b. The preload distributor 154 is coupled to the outer race 144 of the first rotary bearing 140 by way of a rim portion 158. In some embodiments, the rim portion 158 could transfer the force of spring 152 to the outer race 144 of the first rotary bearing 140.

In this way, a spring force is produced by a deflection of the spring 152, which is coupled the preload distributor 154 via the protrusion 156. The preload distributor 154 is additionally coupled to the outer race 144 via the rim portion 158. The preload distributor 154 transfers at least a portion of the spring force to the outer race 144 as an axial preload force 159.

Optical system 200 also includes a motor 170, which could include, for example, a rotor 174 and a stator 172. In some embodiments, the rotor 174 could be coupled to the shaft 120 and the stator 172 could be coupled to the housing 110.

In some embodiments, the shaft 120 could include one or more sets of stops 212 and 214. While FIG. 2A illustrates the stops 212 and 214 as protrusions from the shaft 120, it will be understood that other structures with other shapes could be used as stops. For example, stops 212 and/or 214 could include depressions or slots in the shaft 120.

The optical system 200 can also include a second rotary bearing 160. The second rotary bearing 160 could include an inner race 162 coupled to the shaft 120 and/or stop 214. The second rotary bearing 160 could also include an outer race 164 that is coupled to the housing 110. A plurality of rolling elements 166 could be configured to roll between the inner race 162 and the outer race 164.

Figure 2B:
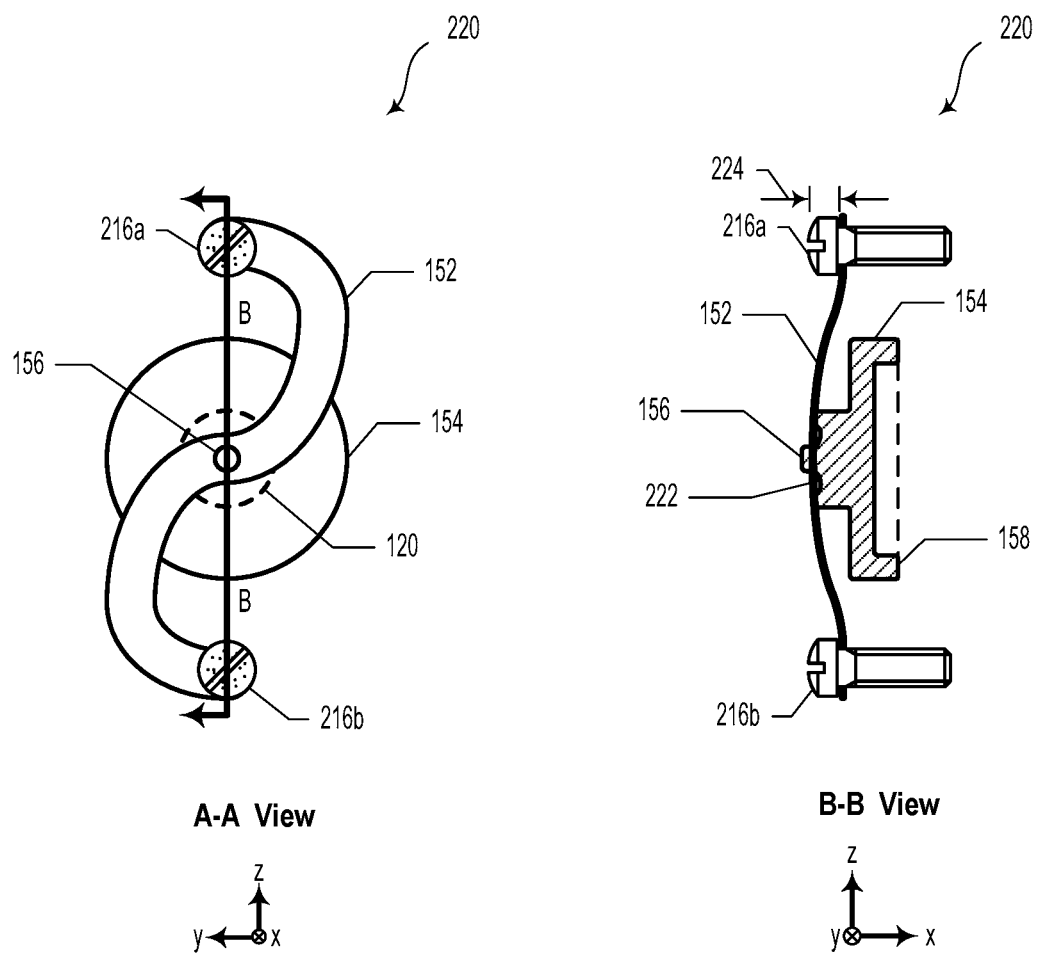
FIG. 2B illustrates a preload mechanism, according to an example embodiment.

FIG. 2B illustrates a preload mechanism 220, according to an example embodiment. The preload mechanism 220 could be similar or identical to preload mechanism 150 as illustrated and described in relation to FIGS. 1 and 2A. Preload mechanism 220 is illustrated along view A-A (as described in FIG. 2A) and along view B-B (as described in view A-A). The preload mechanism 220 could include a spring 152 that is clamped at opposing ends by screws 216a and 216b. When clamped, a middle portion of the spring 152 could be displaced with respect to the end portions of the spring 152. In such scenarios, the spring 152 could be bent or otherwise deformed by a maximum bend extent 224. Accordingly, the spring 152 could apply a restoring spring force to the preload distributor 154.

As shown in FIG. 2B, the preload distributor 154 could be shaped as a disk that includes a central protrusion 156 at a first side of the preload distributor 154 and a rim portion 158 at a second side of the preload distributor 154. The central protrusion 156 can align the spring 152 relative to the preload distributor 154. With this configuration, spring 152 can apply a preload force to the preload distributor 154, and the rim portion 158 of the preload distributor can evenly distribute the preload force along the outer race 144. The preload distributor 154 could include one or more alignment features 222, which could include, for example, slots configured to accept and retain a portion of the spring 152. It will be understood that the preload distributor 154 could take on other shapes.

Figure 3:
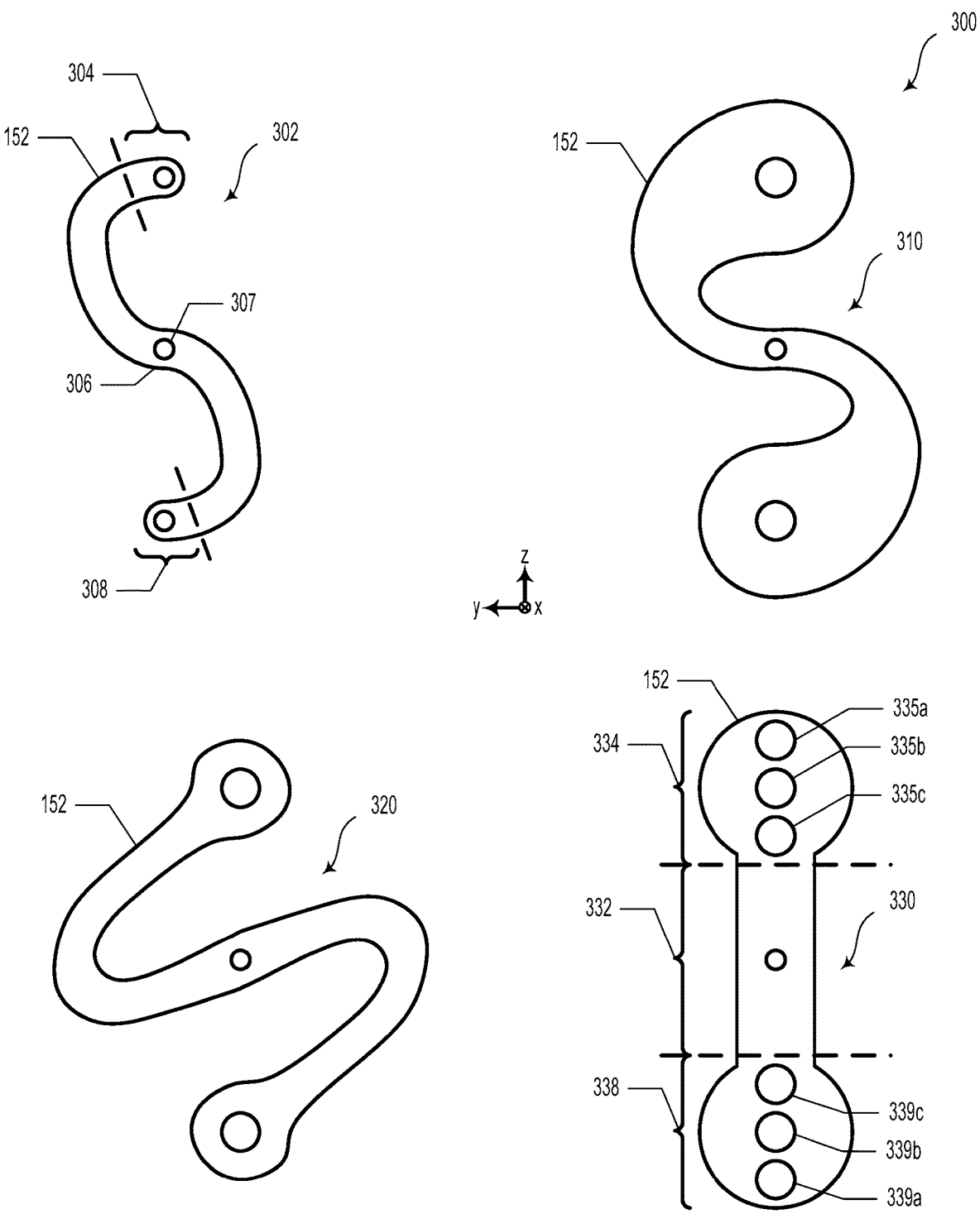
FIG. 3 illustrates a plurality of springs, according to example embodiments.

FIG. 3 illustrates a plurality of springs 300, according to example embodiments. For example, spring 302 could include a flat sheet of material formed into a serpentine shape. Furthermore, in some embodiments, the spring 302 could include a first end portion 304, a second end portion 308, and a middle portion 306. In such embodiments, the first end portion 304 and the second end portion 308 can be physically clamped to the housing 110. Furthermore, the middle portion 306 of the spring 302 is configured to be coupled to the preload distributor 154. In some embodiments, an opening 307 in the spring 302 could accept the protrusion 156 of the preload distributor 154.

As described herein, the middle portion 306 can be displaced (e.g., bent) in an axial direction (e.g., along the −x direction) relative to the first end portion 304 and the second end portion 308. Such bending or displacement of the middle portion 306 could provide a spring force in the +x direction to the outer race 144, which may be utilized, at least in part, as an axial preload force 159.

FIG. 3 illustrates other potential shapes for spring 152 as described herein. For example, spring 152 could be shaped similarly or identically as spring 310, spring 320, or spring 330. In some embodiments, spring 152 could include serpentine shape, however other shapes are contemplated.

In some embodiments, spring 152 could include selectable clamping locations. For example, spring 330 includes a middle portion 332 located between a first end portion 334 and a second end portion 338. The first end portion 334 could include a plurality of different clamping locations 335*a*-*c*. The second end portion 338 could additionally or alternatively include a plurality of different clamping locations 339*a*-*c*. The various clamping locations could be utilized to adjust the spring force of the spring 330.

III. Example Methods

Figure 4:
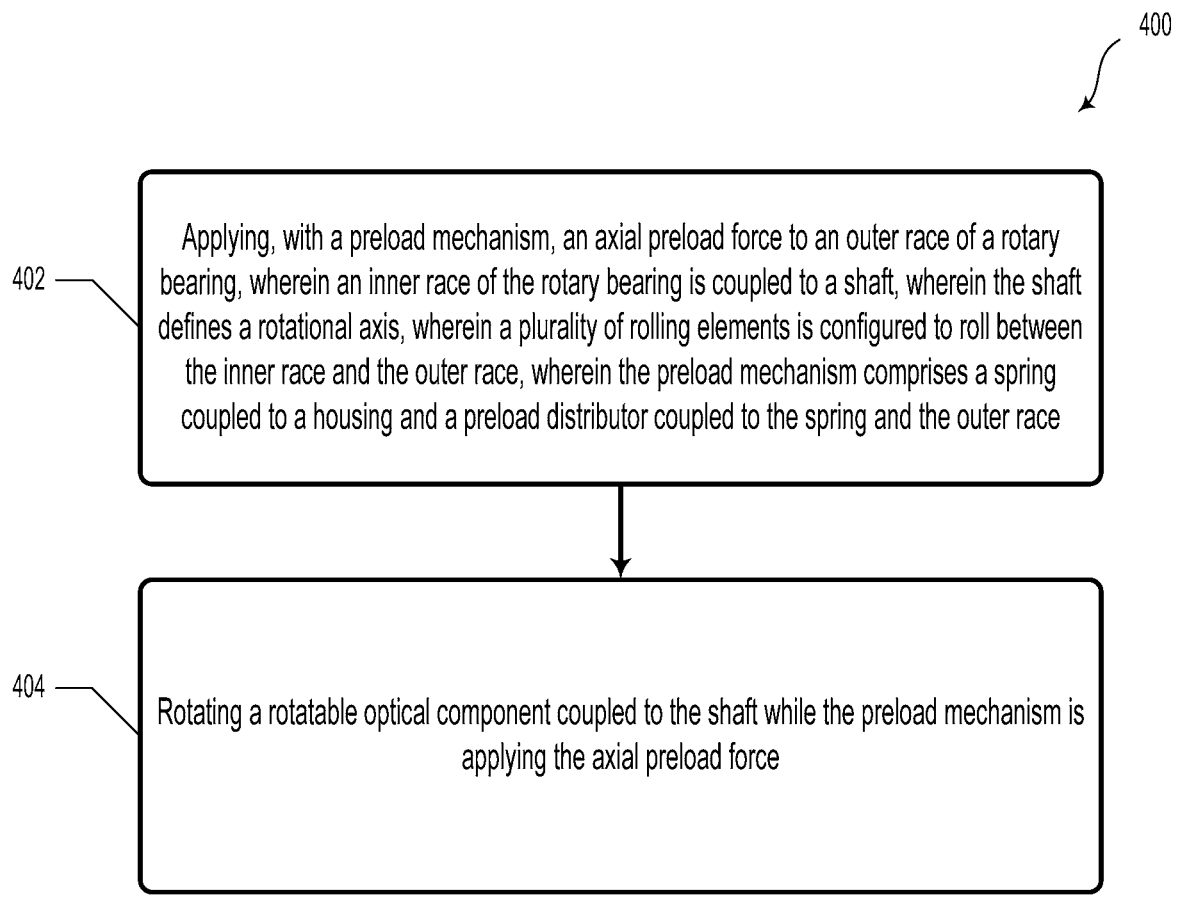
FIG. 4 illustrates a method, according to an example embodiment.

FIG. 4 illustrates a method 400, according to an example embodiment. It will be understood that the method 400 may include more steps or blocks than those expressly illustrated or otherwise disclosed herein. Furthermore, respective steps or blocks of method 400 may be performed in any order and each step or block may be performed one or more times. In some embodiments, some or all of the blocks or steps of method 400 may be carried out in a method of assembly or a repair procedure. The method 400 could include some or all elements of optical system 100, preload mechanism 150, and/or spring 152 as illustrated and described in relation to FIGS. 1, 2A, 2B, and 3.

Block 402 includes applying, with a preload mechanism, an axial preload force (e.g., axial preload force 159). The axial preload force is applied, at least in part, to an outer race of a rotary bearing (e.g., first rotary bearing 140). In such scenarios, an inner race of the rotary bearing is coupled to a shaft that defines a rotational axis (e.g., rotational axis 210). A plurality of rolling elements is configured to roll between the inner race and the outer race.

The preload mechanism (e.g., preload mechanism 150) includes a spring (e.g., spring 152) coupled to a housing and a preload distributor (e.g., preload distributor 154) coupled to the spring and the outer race.

Applying the axial preload force by way of the preload mechanism could be performed by affixing the spring and preload distributor to the housing and outer race, respectively. The spring and the preload distributor could be affixed with one or more fasteners, such as screws 216*a* and 216*b*. Other ways to affix the spring and preload distributor are contemplated, such as mechanical clips, epoxy, glue, and/or other types of adhesive materials.

In some embodiments, the axial preload force could be proportional to at least one of a cross-sectional shape or a clamped length of the spring. For example, the shape, size, and/or material of the spring could be selected so as to provide a desired spring force, which could be proportional to the axial preload force. Additionally or alternatively, one or more clamping or affixing locations along the spring could be selected based on a desired amount of axial preload force. That is, the spring could be attached to the housing by way of a plurality of selectable clamping locations, which could provide selectable adjustment of the amount of axial preload force that is applied to the outer race of the rotary bearing.

Additionally or alternatively, some embodiments could include a middle portion of the spring being deformed in an out-of-plane direction (e.g., along the −x direction as illustrated in FIGS. 2A and 2B. In such scenarios, the axial preload force could be proportional to an amount out-of-plane deformation of the spring (e.g., a maximum bend extent 224 as illustrated in FIG. 2B). In some embodiments, the amount of out-of-plane deformation could be selected and/or adjusted so as to provide a desired amount of axial preload force. As an example, the screws 216*a* and/or 216*b* could be adjusted in the +x direction to increase the amount of axial preload force. Conversely, the screws 216*a* and/or 216*b* could be adjusted in the −x direction to decrease the amount of axial preload force.

Block 404 includes rotating a rotatable optical component coupled to the shaft while the preload mechanism is applying the axial preload force. In some embodiments, a rotatable optical component (e.g., rotatable optical component 130) could be disposed along the shaft. In such examples, the rotatable optical component could include a multi-sided mirror, such as a three-sided prism mirror.

In some embodiments, rotating the rotatable optical component could include controlling a motor (e.g., motor 170) to rotate the shaft, thereby rotating the rotatable optical component. In such scenarios, the motor could be controlled by a controller (e.g., controller 180). Applying the axial preload force as described herein could improve the rotational performance of the rotatable optical component. For example, applying the axial preload force could reduce bearing runout and/or vibration (e.g., chattering) during rotation of the rotatable optical component. In some embodiments, applying the axial preload force could include fine-tuning the axial preload force so as to improve one or more operational aspects of the rotatable optical component. For example, the operational aspects of the rotatable optical component could include vibration and/or periodic movement along the axial direction (x-axis). In such scenarios, fine-tuning the axial preload force could include adjusting the axial preload force (e.g., by adjusting the maximum bend extent 224 and/or clamped length of spring 152) during rotation of the rotatable optical component so as to minimize or otherwise reduce such vibration or periodic movement.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various aspects and embodiments have been disclosed herein, other aspects and embodiments will be apparent to those skilled in the art. Embodiments of the present disclosure may thus relate to one of the enumerated example embodiments (EEEs) listed below.

EEE 1 is a method comprising:
applying, with a preload mechanism, an axial preload force to an outer race of a rotary bearing, wherein an inner race of the rotary bearing is coupled to a shaft, wherein the shaft defines a rotational axis, wherein a plurality of rolling elements is configured to roll between the inner race and the outer race, wherein the preload mechanism comprises a spring coupled to a housing and a preload distributor coupled to the spring and the outer race; and
rotating a rotatable optical component coupled to the shaft while the preload mechanism is applying the axial preload force.

EEE 2 is the method of EEE 1, wherein the axial preload force is proportional to at least one of a cross-sectional shape or a length of the spring.

EEE 3 is the method of EEE 1, wherein a middle portion of the spring is deformed in an out-of-plane direction, wherein the axial preload force is proportional to an out-of-plane deformation of the spring.

EEE 4 is the method of EEE 1, wherein the rotatable optical component comprises a multi-sided mirror.

The various disclosed aspects and embodiments are for purposes of illustration and are not intended to be limiting, with the true scope being indicated by the following claims.

What is claimed is:

1. An optical system comprising:
a housing;
a shaft defining a rotational axis;
a rotatable optical component coupled to the shaft;
a first rotary bearing comprising:
an inner race;
an outer race; and
a plurality of rolling elements configured to roll between the inner race and the outer race, wherein the inner race is coupled to the shaft, wherein the outer race is coupled to the housing; and
a preload mechanism comprising:
a spring coupled to the housing; and
a preload distributor coupled to the spring and the outer race, wherein the spring is configured to apply an axial preload force to the outer race through the preload distributor.

2. The optical system of claim 1, wherein the rotatable optical component comprises a multi-sided mirror.

3. The optical system of claim 1, wherein at least a portion of the rotatable optical component is hollow.

4. The optical system of claim 1, wherein the spring comprises a sheet of material formed into a serpentine shape.

5. The optical system of claim 1, wherein the spring comprises a first end portion, a second end portion, and a middle portion, wherein the first end portion and the second end portion are clamped to the housing, and wherein the middle portion is coupled to the preload distributor.

6. The optical system of claim 5, wherein the middle portion is displaced in an axial direction relative to the first and second end portions.

7. The optical system of claim 1, wherein the preload distributor is disk shaped, wherein the preload distributor comprises a protrusion and a rim portion.

8. The optical system of claim 7, wherein the preload distributor is coupled to the spring via the protrusion and wherein the preload distributor is coupled to the outer race via the rim portion.

9. The optical system of claim 1, wherein at least one of the spring or the preload distributor comprises brass.

10. The optical system of claim 1, wherein the axial preload force is proportional to at least one of a cross-sectional shape or a length of the spring.

11. The optical system of claim 1, wherein a middle portion of the spring is deformed in an out-of-plane direction, wherein the axial preload force is proportional to an out-of-plane deformation of the spring.

12. The optical system of claim 1, wherein the spring has a thickness within a range of 50 microns to 150 microns.

13. The optical system of claim 1, further comprising a second rotary bearing and a stop along the shaft.

14. The optical system of claim 13 wherein an inner race of the second rotary bearing is coupled to the stop.

15. The optical system of claim 13 wherein an outer race of the second rotary bearing is coupled to the housing.

16. A light detection and ranging (LIDAR) system comprising:
at least one rotary bearing; and
a spring coupled to the at least one rotary bearing, wherein the spring is formed from sheet-type material, and wherein the spring comprises a flat serpentine shape.

17. The LIDAR system of claim 16, further comprising:
a housing;
a shaft defining a rotational axis;
a rotatable optical component coupled to the shaft, wherein the at least one rotary bearing comprises:
an inner race;
an outer race; and
a plurality of rolling elements configured to roll between the inner race and the outer race, wherein the inner race is coupled to the shaft, wherein the outer race is coupled to the housing; and
a preload mechanism comprising:
the spring, wherein the spring is coupled to the housing; and a preload distributor coupled to the spring and the outer race, wherein the spring is configured to apply an axial preload force to the outer race through the preload distributor.

18. The LIDAR system of claim 17, wherein the spring comprises a first end portion, a second end portion, and a middle portion, wherein the first end portion and the second end portion are clamped to the housing, and wherein the middle portion is coupled to the preload distributor.

19. The LIDAR system of claim 17, wherein the middle portion is displaced in an axial direction relative to the first and second end portions.

20. The LIDAR system of claim 17, wherein the preload distributor is disk shaped, wherein the preload distributor comprises a protrusion and a rim portion, wherein the preload distributor is coupled to the spring via the protrusion, and wherein the preload distributor is coupled to the outer race via the rim portion.

\* \* \* \* \*